(12) United States Patent
Haka et al.

(10) Patent No.: US 7,291,087 B2
(45) Date of Patent: Nov. 6, 2007

(54) PLANETARY MANUAL TRANSMISSION

(75) Inventors: Raymond J. Haka, Brighton, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 234 days.

(21) Appl. No.: 11/035,343

(22) Filed: Jan. 13, 2005

(65) Prior Publication Data

US 2006/0154777 A1    Jul. 13, 2006

(51) Int. Cl.
    *F16H 3/44*    (2006.01)
(52) U.S. Cl. .................................................. 475/303
(58) Field of Classification Search ................ 475/284, 475/286, 288, 290, 296, 303
    See application file for complete search history.

(56) References Cited

U.S. PATENT DOCUMENTS 6,669,596 B1 * 12/2003  Sefcik ......................... 475/278
6,811,010 B1 * 11/2004  Armstrong ............... 192/48.91

* cited by examiner

*Primary Examiner*—Roger Pang
*Assistant Examiner*—Derek D. Knight (57) ABSTRACT

A powertrain has a power transmission including a pair of planetary gearsets. The planetary gearsets are selectively interconnectible with an input shaft through a plurality of synchronizer mechanisms to provide ten forward speed ratios and two reverse speed ratios.

4 Claims, 7 Drawing Sheets

PLANETARY MANUAL TRANSMISSION

TECHNICAL FIELD

This invention relates to power transmissions and, more particularly, to power transmissions having planetary gearsets and mechanical clutches.

BACKGROUND OF THE INVENTION

Current automotive vehicles and trucks include a multi-speed power transmission. The use of planetary gearsets and automatic shifting power transmissions has become more prominent in the field of vehicle transportation. The planetary transmissions employed in the powertrains generally include two or more planetary gearsets and a plurality of fluid-operated torque-transmitting mechanisms, commonly termed clutches and brakes.

While these arrangements operate very well and provide for simplicity of operation, it is desirable to improve efficiency of these units. One way of improving the efficiency is to remove the hydraulic components from the transmission. This, of course, was done in many previous power transmissions utilizing countershaft arrangements and synchronizer shifting mechanisms. The synchronizer shifting mechanisms generally employed a manual control mechanism, thereby eliminating the need for high pressure hydraulic fluid within the transmission control system.

More recently, it has been found that the planetary-type gearset will lend itself quite well to mechanical- or synchronizer-type clutches and brakes.

SUMMARY OF THE INVENTION

It is an object of the present invention to provide an improved planetary transmission incorporating mechanical clutch mechanisms.

In one aspect of the present invention, a power transmission incorporates two planetary gearsets that are controlled by at least three mechanical clutches.

In another aspect of the present invention, the mechanical clutches provide three input mechanisms and two brake mechanisms.

In yet another aspect of the present invention, one of the mechanical clutches provides an input drive selectively to each of the planetary gearsets.

In still another aspect of the present invention, one of the mechanical clutches provides an input drive to one of the planetary gearsets and a brake mechanism also for that planetary gearset.

In yet still another aspect of the present invention, the mechanical clutches are selectively controlled to establish at least six forward speed ratios and one reverse speed ratio between a transmission input shaft and a transmission output shaft.

In a further aspect of the present invention, five mechanical clutch mechanisms are incorporated with two planetary gearsets to provide a power transmission that is capable of establishing six forward speed ratios, seven forward speed ratios, eight forward speed ratios, nine forward speed ratios or, ten forward speed ratios.

In yet a further aspect of the present invention, a planetary gear arrangement includes planetary gearsets, which are continuously interconnected by at least one member, and at least three mechanical clutch mechanisms wherein one of the clutch mechanisms interconnects the interconnected members with the transmission input shaft, another of the mechanical clutches connects a single member of one of the planetary gearsets with the input shaft or with a transmission housing, and a further of the mechanical clutches connects a member of one of the planetary gearsets with a member of the other planetary gearset or with the transmission housing.

DESCRIPTION OF THE EXEMPLARY EMBODIMENTS

Figure 1:
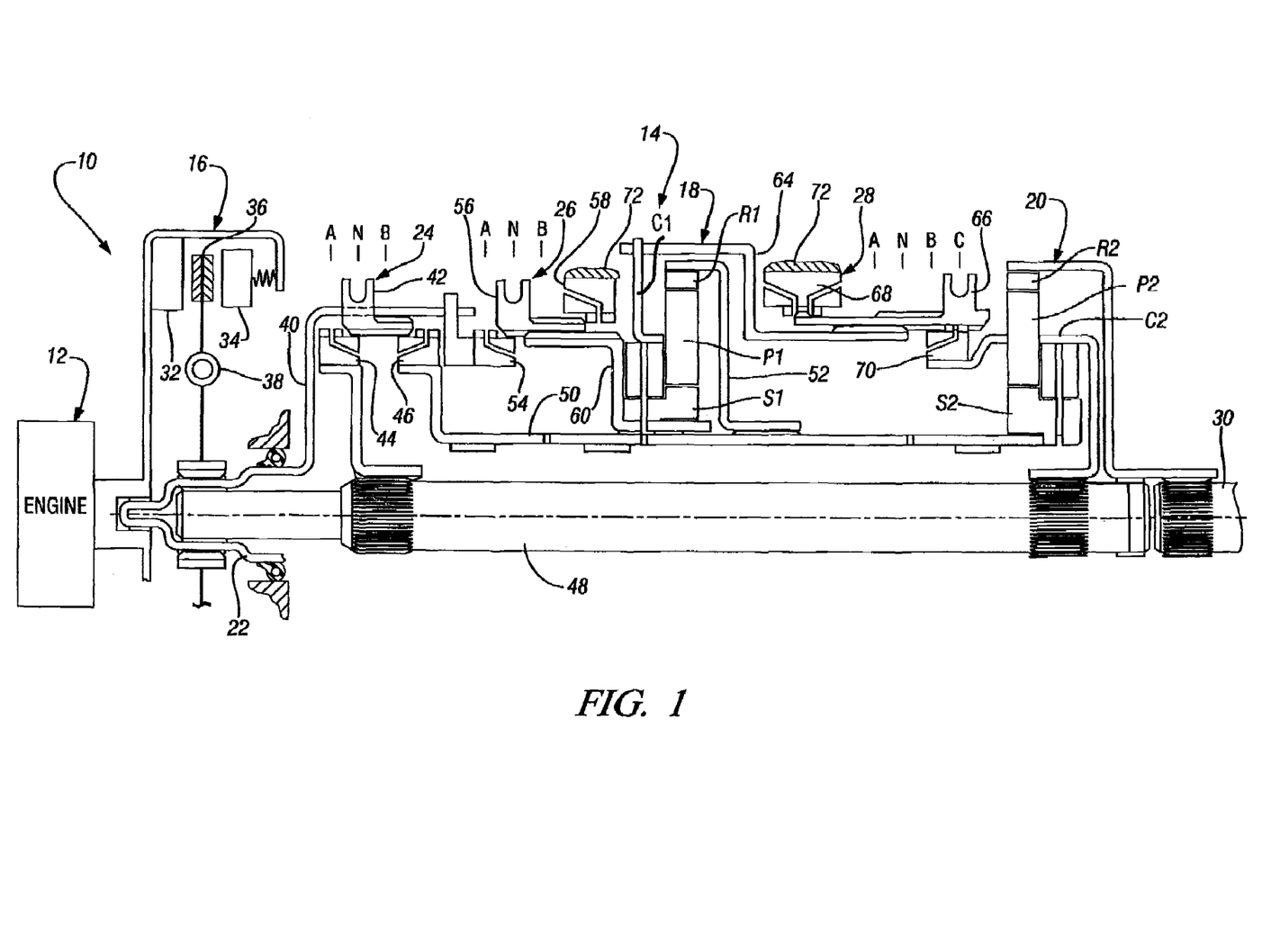
FIG. 1 is a diagrammatic representation of a powertrain having a transmission incorporating the present invention.

Referring to the drawings, wherein like characters represent the same or corresponding parts throughout the several views, there is seen in FIG. 1 a powertrain 10 having an engine 12 and a power transmission 14. The power transmission 14 has an input clutch 16, a pair of planetary gearsets 18 and 20, an input shaft 22, a first torque-transmitting mechanism such as a mechanical clutch or synchronizer 24, a second torque-transmitting mechanism such as a mechanical clutch or synchronizer 26, a third torque-transmitting mechanism such as a mechanical clutch or synchronizer 28, and an output shaft 30.

The planetary gearset 18 includes a sun gear member S1, a ring gear member R1, and a planet carrier member C1. The planet carrier member C1 has rotatably mounted thereon a plurality of pinion gears P1 that are disposed in meshing relationship with the sun gear member S1 and ring gear member R1.

The planetary gearset 20 includes a sun gear member S2, a ring gear member R2, and a planet carrier member C2. The planet carrier member C2 has rotatably mounted thereon a plurality of pinion gears P2 that are disposed in meshing relationship with the sun gear member S2 and ring gear member R2. The ring gear member R2 is continuously connected with the output shaft 30.

The input clutch 16 provides a selectively engageable drive between the engine 12 and the input shaft 22. The input clutch 16 has a pair of plates 32 and 34 disposed about a friction element 36. The friction element 36 is connected with the input shaft 22 through a conventional damper mechanism 38. When the plates 32 and 34 are brought into engagement with the friction element 36, a drive connection is completed between the engine 12 and the input shaft 22.

The input shaft 22 is drivingly connected to a hub member 40, which is drivingly connected with a shift collar 42 of the synchronizer 24. The synchronizer 24 has two output hubs 44 and 46 connected with an intermediate shaft 48 and a sleeve shaft 50, respectively. The intermediate shaft 48 is continuously connected with the planet carrier member C2 of the planetary gearset 20. The sleeve shaft 50 is continuously connected with the ring gear member R1 through a hub 52 and with the sun gear member S2 of the planetary gearset 20.

The hub 40 is also drivingly connected with a clutch member 54, which is a component of the synchronizer 26. The synchronizer 26 also includes a shift collar 56 and a ground member 58. The shift collar 56 is drivingly connected through a hub 60 with the sun gear member S2. The planet carrier member C1 is drivingly connected through a hub 64 with a shift collar 66, which is a member of the synchronizer 28. The synchronizer 28 also includes a ground member 68 and an output member 70. The output member 70 is continuously connected with the planet carrier member C2. The ground members 68 and 58 are continuously connected with a portion of a transmission housing 72.

The synchronizer 24 has an A position, a B position, and an N position. The N position is a neutral condition wherein the synchronizer does not provide a drive connection between elements of the transmission. In position A, the synchronizer 24 will drivingly connect the hub member 40 with the intermediate shaft 48. This effectively connects the input shaft 22 with the planet carrier member C2. In the B position, the synchronizer 24 will drivingly connect the hub 40 with the sleeve shaft 50. This effectively interconnects the input shaft 22 with both the ring gear member R1 and the sun gear member S2.

The synchronizer 26 has an A position, an N position, and a B position. Again, the N position is a neutral condition. In the A position, the synchronizer 26 will provide a drive connection between the hub 40 and the sun gear member S1. In the B position, the synchronizer 26 will provide a braking connection for the sun gear member S1 with the transmission housing 72.

The synchronizer 28 has four operating positions A, N, B, and C. Again, in the N position, the synchronizer 28 is in neutral and provides no connections between the transmission members. In the A position, the synchronizer 28 will interconnect the planet carrier member C1 with the transmission housing 72. In the B position, the synchronizer 28 will interconnect the planet carrier members C1 and C2. In the C position, the synchronizer 28 will interconnect the planet carrier members C1 and C2 with the transmission housing 72.

During transmission operation, the synchronizer 24 is in the N position for a first forward speed ratio in the neutral condition, in the A position for the third, fifth, and sixth forward speed ratios, and in the B position for the second forward speed ratio, the fourth forward speed ratio, and the reverse speed ratio. The synchronizer 26 is in the A position for the first, fourth, and sixth forward speed ratios, in the N position for the reverse and neutral conditions, and in the B position for the second, third, and fifth forward speed ratios. The synchronizer 28 is in the A position for the sixth forward speed ratio, in the N position for the fifth forward speed ratio, in the B position for the second and third forward speed ratios, and in the C position for the reverse speed ratio and first forward speed ratio.

Figure 2:
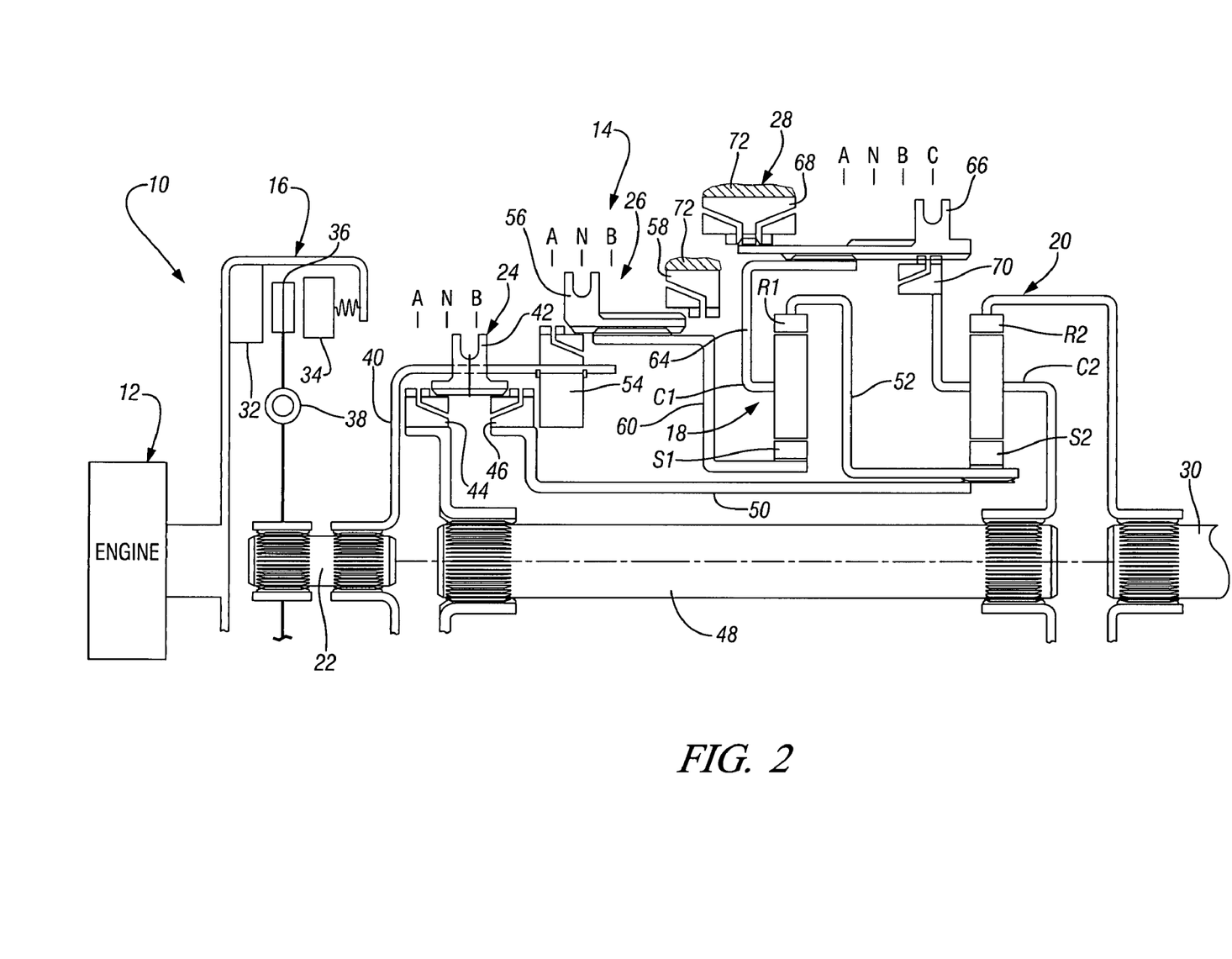
FIG. 2 is a diagrammatic representation of a powertrain having the transmission depicted in FIG. 1 with a different location for the mechanical clutches.
Figure 3A:
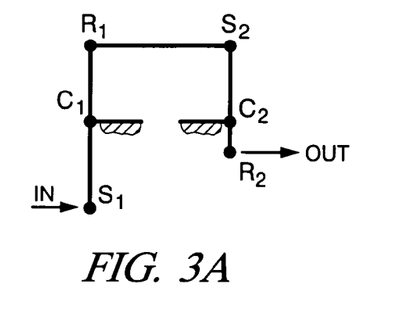
FIG. 3A through FIG. 3G are lever diagrams showing the various speed ratios obtainable with the transmissions depicted in FIGS. 1 and 2.
Figure 3B:
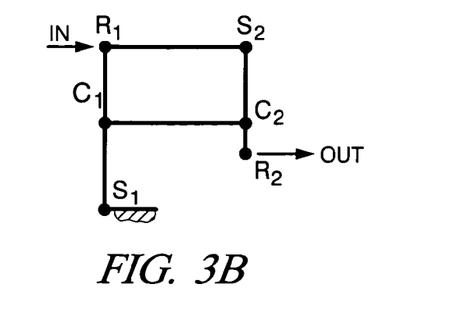
Figure 3C:
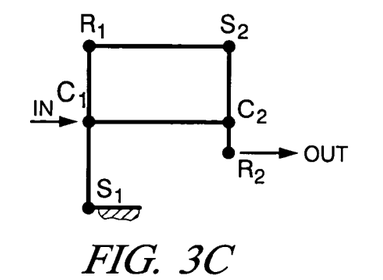
Figure 3D:
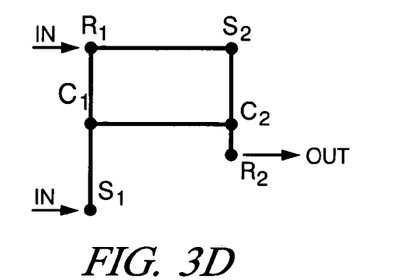
Figure 3E:
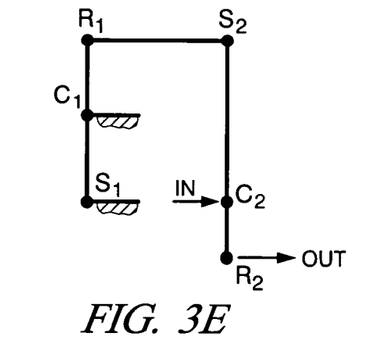
Figure 3F:
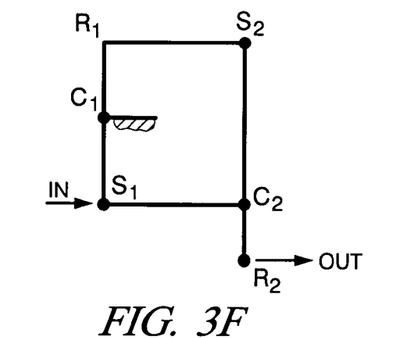
Figure 3G:
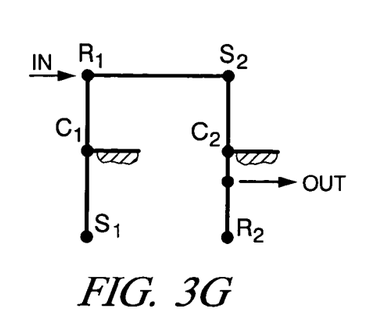

In FIG. 2, the powertrain 10 is the same as the powertrain in FIG. 1. The same numerical designations have been given to the components since they operate in an identical manner. The significant difference between the transmissions 14 shown in FIGS. 1 and 2 is the rotation of the synchronizers 24, 26, and 28. Particularly, the position of the synchronizer 28 is the most significant. It should be noted that the synchronizer elements have been moved outboard of the maximum radius of the planetary gearsets such that the planetary gearset 20 can be moved forward in closer approximation with the planetary gearset 18. This permits the transmission to be considerably shorter in axial length while enlarging the transmission profile in radial or barrel diameter. Thus, where the transmission might interfere with the floor of the passenger vehicle, a longer and less diameter transmission, such as that shown in FIG. 1, can be employed and where the barrel diameter is of no consequence, the transmission shown in FIG. 2 can be employed. The transmission shown in FIG. 2 would be more advantageous for a transverse mounted powertrain and the transmission shown in FIG. 1 would be more advantageous for a longitudinal mount powertrain.

The selections of the position for the synchronizers are shown in lever diagrams A through G of FIG. 3. Those familiar with the lever diagram description will recognize the connections made in the diagrammatic selections A through G of FIG. 3. For example in FIG. 3A, the planet carrier members C1 and C2 are interconnected and connected with ground when the synchronizer 28 is in the C position. The sun gear member S1 is connected with the input shaft 22; therefore, the synchronizer 26 is in the A position. In each of the lever diagrams, it is readily apparent which connections are made by the synchronizers.

Figure 4:
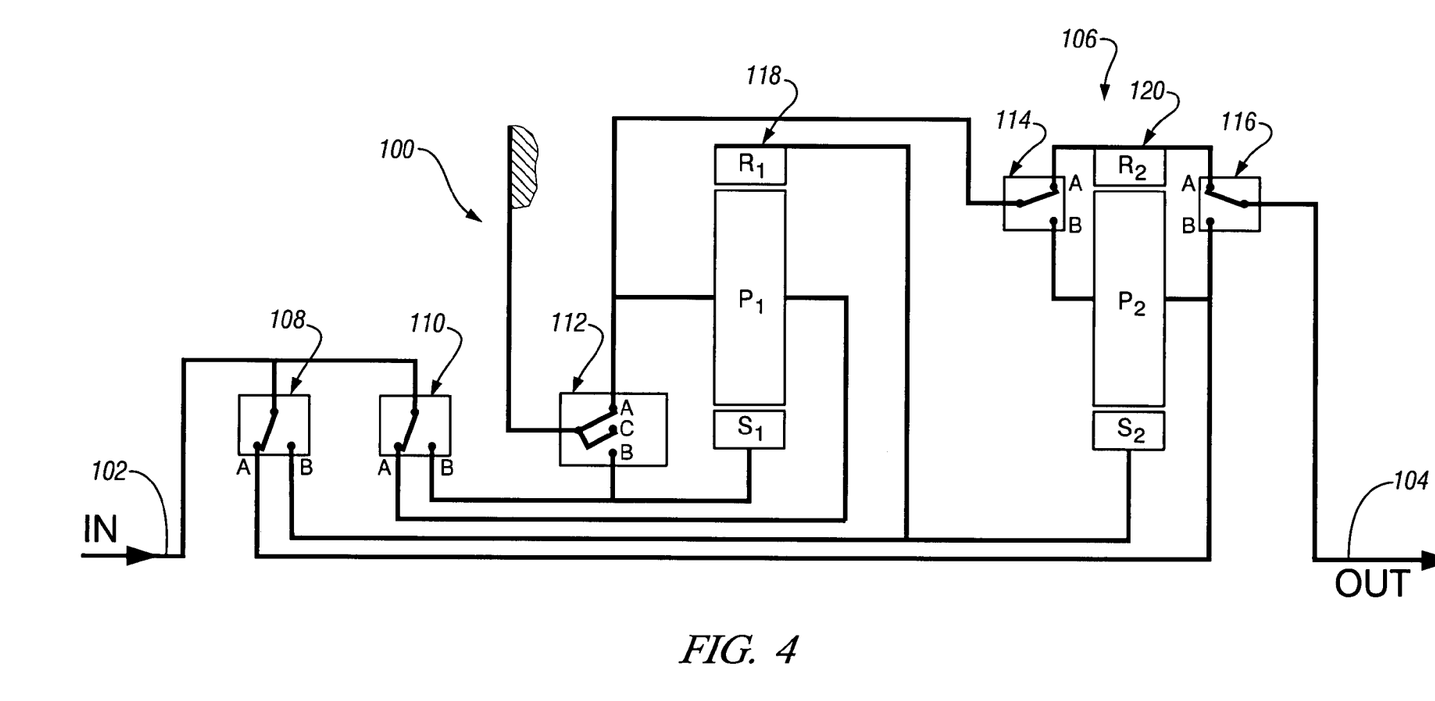
FIG. 4 is a schematic representation of an alternative embodiment of the present invention.

The schematic representation of FIG. 4 depicts a power transmission which is an enhancement of the power transmission shown in FIGS. 1 and 2. The power transmission 100 having an input shaft 102, an output shaft 104, a planetary gear arrangement 106, and five torque transmitting mechanisms or synchronizer mechanisms 108, 110, 112, 114, and 116. The planetary gear arrangement 106 has two planetary gearsets 118 and 120.

The planetary gearset 118 is the same assembly as the planetary gearset 18 shown in FIG. 1 and includes the sun gear member S1, the ring gear member R1, planet carrier member C1, and a plurality of pinion gear members P1 interconnecting the R1 and the sun gear member S1.

The planetary gearset 120 is the same assembly as the planetary gearset 20 shown in FIG. 1 and includes the sun gear member S2, the ring gear member R2, the planet carrier member C2, and a plurality of pinion gear members P2 interconnecting the sun gear member S2 with the ring gear member R2. The ring gear member R1 is connected continuously with the sun gear member S2 as described above for FIG. 1.

The synchronizer mechanism 108 has positions A, N, and B; the synchronizer mechanism 110 has positions A, N, and B; the synchronizer mechanism 112 has positions A, N, B, and C; the synchronizer mechanism 114 has positions A, N, and B; and the synchronizer mechanism 116 has positions A, N, and B.

In the A position, the synchronizer mechanism 108 interconnects the input shaft 102 with the planet carrier member C2, again, in the N position there is no connection, and in the B position interconnects the ring gear member R1 and sun gear member S2 with the input shaft 102, the same as described for synchronizer 24 in FIG. 1. In the A position, the synchronizer mechanism 110 interconnects the planet carrier member C1 with the input shaft 102 and in the B position interconnects the sun gear member S1 with the input shaft 102. The input drive to the planet carrier member C1 was not a function available with the transmission 14.

In the A position, the synchronizer mechanism 112 connects the planet carrier member C1 with ground, in the B position connects the sun gear member S1 with ground, and in the C position connects both the planet carrier member C1 and the sun gear member S1 with ground. In the A position, the synchronizer mechanism 114 connects the planet carrier member C1 with the ring gear 120; in the B position interconnects the planet carrier member C1 with the planet carrier member C2. In the A position, the synchronizer mechanism 116 interconnects the ring gear member R2 with the output shaft 104, and in the position B connects the planet carrier member C2 with the output shaft 104.

Figure 5:
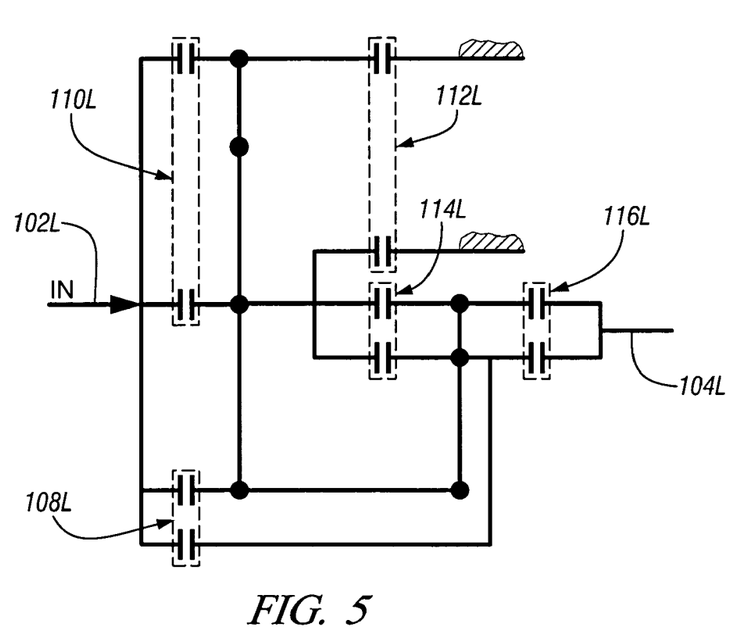
FIG. 5 is a lever diagram representing the transmission shown in FIG. 4.
Figure 6A:
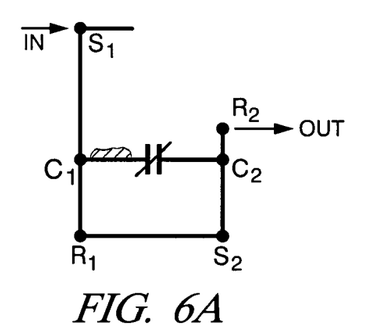
FIG. 6A through FIG. 6L are lever diagrams depicting the speed ratios obtainable with the transmission shown in FIG. 4.
Figure 6B:
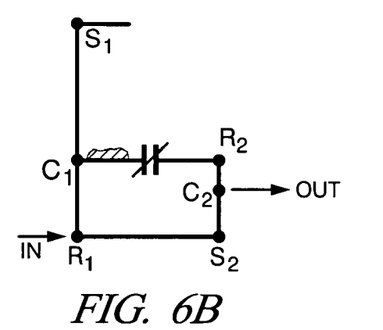
Figure 6C:
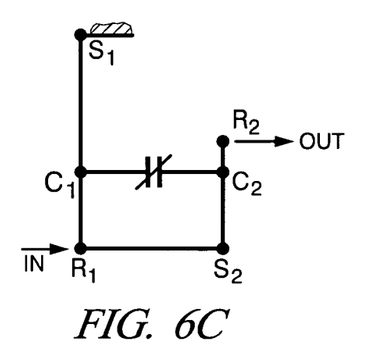
Figure 6D:
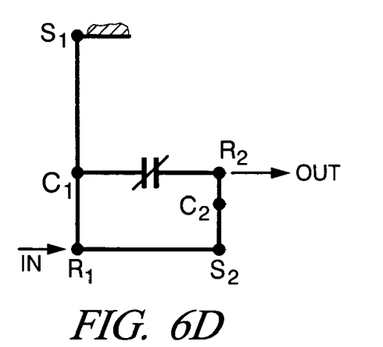
Figure 6E:
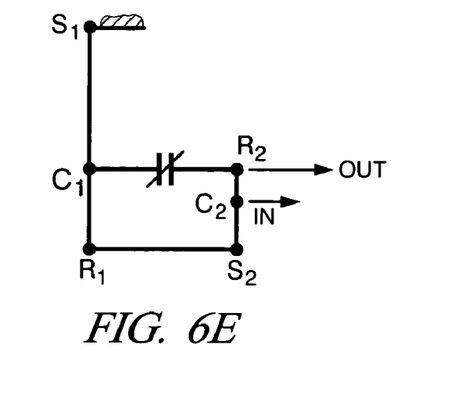
Figure 6F:
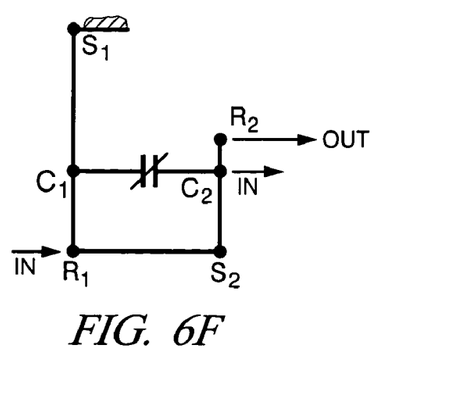
Figure 6G:
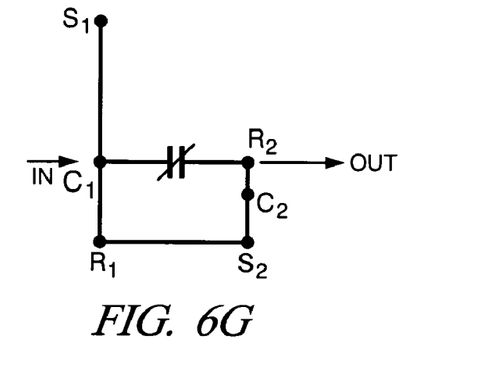
Figure 6H:
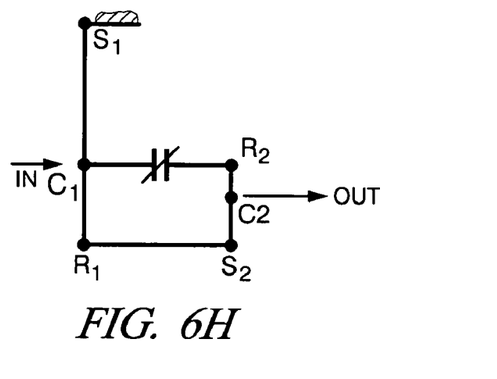
Figure 6I:
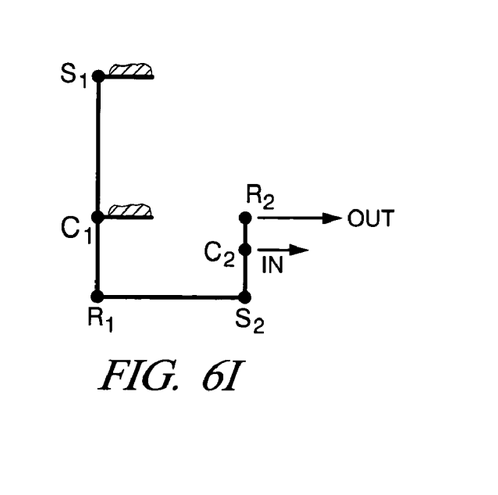
Figure 6J:
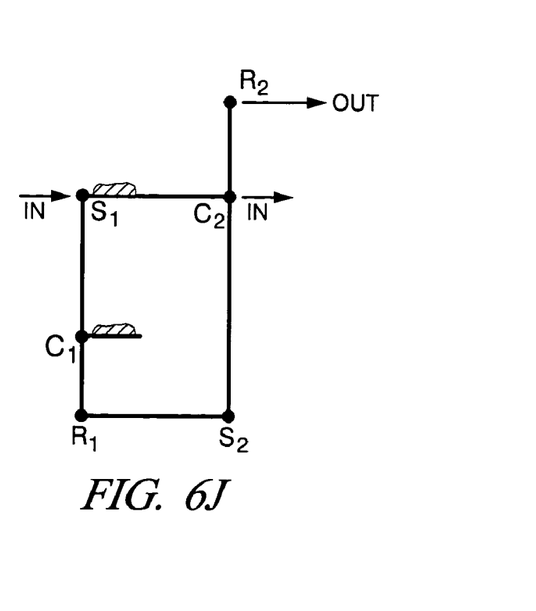
Figure 6K:
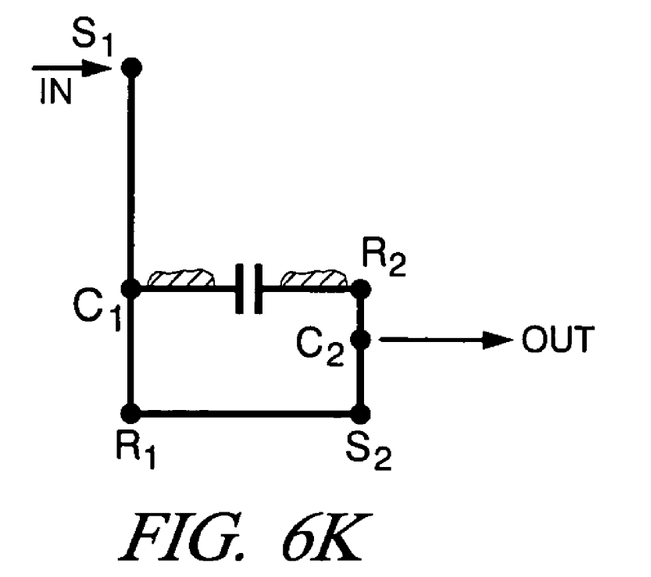
Figure 6L:
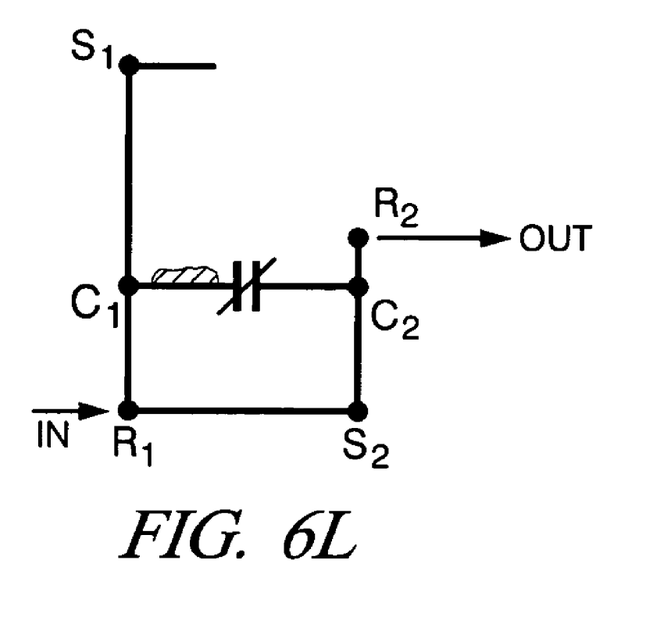

FIG. 5 is a lever diagram representation of the transmission shown in FIG. 4. The synchronizer mechanisms have been given the same numerical designations with an "L" suffix. It should be noted that the synchronizer mechanism 108L can connect the input shaft 102 with either the planet carrier member C2 or the ring gear member R1 and the sun gear member S2. The synchronizer mechanism 110L can interconnect the input shaft 102 with the planet carrier member C1 or the ring gear member R1. The synchronizer mechanism 112L can interconnect the sun gear member S1 with ground, interconnect the planet carrier member C1 with ground, or connect both the sun gear member S1 and planet carrier member C1 with ground, simultaneously. The synchronizer mechanism 114L can connect the planet carrier member C1 with the ring gear member R2 or with the planet carrier member C2. The synchronizer mechanism 116L can interconnect the ring gear member R2 with the output shaft 104 or interconnect the planet carrier member C2 with the output shaft 104.

The lever representations shown in FIGS. 6A through 6L represent the conditions of operation possible with the transmission shown in FIG. 4. The transmission shown in FIG. 4 is capable of ten forward speeds, FIGS. 6A through 6J, and two reverse speeds, FIGS. 6K and 6L. The operation of the synchronizer mechanisms for these various conditions will be apparent to those skilled in the art. For example in FIG. 6A, it will be noticed that the synchronizer mechanism 110L connects the sun gear member S1 with the input shaft 102 and the synchronizer mechanism 112L is in a position to connect the planet carrier members C1 and C2 with ground while the synchronizer mechanism 114L is in a position to interconnect the planet carrier members C1 and C2. In the lever diagram FIG. 6I, the synchronizer mechanism 112L is operable to connect both the planet carrier member C1 and the sun gear member S1 with ground. In the diagram FIG. 6J, the synchronizer mechanism 112L connects the planet carrier member C1 to ground.

The transmission represented in FIG. 4 is capable of ten forward speeds and two reverse speeds. However, it is also capable of six, seven, eight, or nine forward speeds by just eliminating the synchronizer selections. The elimination of one or more forward speeds can be used to improve the progression (steps between the ratios).

The transmissions shown in FIGS. 1 and 2 are capable of six forward speeds of operation. The transmissions of FIGS. 1 and 2 do not provide as much of a ratio spread as the transmission described in FIG. 4. For example, the transmission shown in FIG. 1 might have a R1/S1 ratio of 1.84 and an R2/S2 ratio of 2.06. With these ring gear/sun ratios, the transmission would provide a reverse drive of having the ratio of −2.059, a first gear ratio of 3.793, a second gear ratio 2.095, a third gear ratio of 1.358, a fourth gear ratio of 1, a fifth gear ratio of 0.673, and a sixth gear ratio of 0.572.

The power transmission shown in FIG. 4 can employ a R1/S1 ratio of 2.33 and a R2/S2 ratio of 2.06. With these ring gear/sun gear ratios, the transmission will provide a reverse speed of −7.137, a first speed ratio of 4.804, a second speed ratio of 3.059, a third speed ratio of 1.804, a fourth speed ratio of 1.429, a fifth speed ratio of 1.263, a sixth speed ratio of 1.140, a seventh speed ratio of 1, an eighth speed ratio of 0.877, a ninth speed ratio of 0.673, and a tenth speed ratio of 0.590. While this selection provides ten forward speeds, it might be more desirable to utilize only six of the ten forward speeds as well as a forward creeper speed. With this selection of ring to sun ratios, the original ratios of reverse, first, second, third, fifth, eighth, ninth, and tenth can be selected to provide a transmission having a reverse speed ratio of −7.137, a creeper ratio of 4.804, a first speed ratio of 3.059, a second speed ratio of 1.804, a third speed ratio of 1.263, a fourth speed ratio of 0.877, a fifth speed ratio of 0.673, and a sixth speed ratio of 0.590, which would be a more desirable progression for automotive use.

When the ten forward speed ratio transmission is utilized, the intermediate ratios of fourth to eight have very small ratio steps. These ratio steps are in the order 1.11:1 to 1.14:1. The very close ratio steps are quite often undesirable particularly in automotive vehicles while they may be desirable in some heavy truck applications. Also, the power transmission described above in FIG. 4 permits a system or an interchange of the output shaft with members of the planetary gearsets. When such an arrangement is employed with fluid-operated friction devices, a great deal of torque must be carried by the shifting mechanisms which results in a significant spin loss when this large capacity clutch is disengaged. This is not true of synchronizer-type transmissions since the dog clutch is able to carry extremely high levels of torque with little or no drag torque in the disengaged mode. Thus, the transmission shown in FIG. 4 provides an advantage over power transmissions employing hydraulically-operated friction devices.

The invention claimed is:

1. A power transmission comprising:
   a first planetary gearset having a first member, a second member, and a third member;
   a second planetary gearset having a first member, a second member, and a third member;
   an input shaft;
   an output shaft;
   a first synchronizer mechanism for selectively interconnecting said first member of both of said planetary gearsets with said input shaft and for interconnecting said input shaft with said second member of said second planetary gearset;
   a second synchronizer mechanism for selectively interconnecting said second member of said first planetary gearset with said input shaft and for selectively interconnecting said second member of said first planetary gearset with a stationary member of said transmission;
   a third synchronizer mechanism for selectively interconnecting said third member of said first planetary gearset with said second member of said second planetary gearset, and for selectively interconnecting said third member of said first planetary gearset with said stationary member; and
   means for interconnecting said third member of said second planetary gearset with said output shaft wherein said synchronizer mechanisms are selectively engageable to provide at least six forward speed ratios and a reverse speed ratio between said input shaft and said output shaft.

2. The power transmission defined in claim 1 further wherein:
   said first member of said first planetary gearset is a ring gear, said second member of said first planetary gearset is a sun gear, said third member of said first planetary gearset is a planet carrier, said first member of said second planetary gearset is a sun gear, said second member of said second planetary gearset is a planet carrier, and said third member of said second planetary gearset is a ring gear.

3. The power transmission defined in claim 1 wherein:
said third synchronizer mechanism is disposed between said first planetary gearset and said second planetary gearset.

4. The power transmission defined in claim 1 wherein:
said third synchronizer mechanism is disposed radially outboard of one of said first planetary gearset and said secondary planetary gearset.

* * * * *